(12) United States Patent
Nightingale

(10) Patent No.: US 6,876,941 B2
(45) Date of Patent: Apr. 5, 2005

(54) TESTING COMPLIANCE OF A DEVICE WITH A BUS PROTOCOL

(75) Inventor: Andrew Mark Nightingale, Cambridge (GB)

(73) Assignee: Arm Limited, Cambridge (GB)

(*) Notice: Subject to any disclaimer, the term of this patent is extended or adjusted under 35 U.S.C. 154(b) by 191 days.

(21) Appl. No.: 10/084,145

(22) Filed: Feb. 28, 2002

(65) Prior Publication Data
US 2002/0183956 A1 Dec. 5, 2002

(30) Foreign Application Priority Data
Apr. 12, 2001 (GB) .............................................. 0109283
May 8, 2001 (GB) .............................................. 0111195

(51) Int. Cl.[7] .......................... G06F 19/00; G06F 13/14
(52) U.S. Cl. ..................................... 702/120; 710/305
(58) Field of Search ........................ 702/120; 370/402; 710/306, 305

(56) References Cited

U.S. PATENT DOCUMENTS

| | | | |
|---|---|---|---|
| 6,366,973 B1 * | 4/2002 | Lo et al. ...................... | 710/306 |
| 6,425,071 B1 * | 7/2002 | Lo et al. ....................... | 712/41 |
| 6,574,691 B1 * | 6/2003 | Jirgal et al. .................. | 710/100 |
| 6,581,019 B1 * | 6/2003 | Bapst et al. ................. | 702/120 |
| 6,678,645 B1 * | 1/2004 | Rajsuman et al. ............ | 703/20 |

FOREIGN PATENT DOCUMENTS

WO    WO 00/23893    4/2000

OTHER PUBLICATIONS

Kishi et al., "Hardware Development of micro–Plat", Dec. 2000, OKI Technical Review 184, vol. 67, pp. 24–27.*
IBM, "The CoreConnect Bus Architecture", IBM 1999.*

* cited by examiner

Primary Examiner—Bryan Bui
Assistant Examiner—Toan M. Le
(74) Attorney, Agent, or Firm—Nixon & Vanderhye P.C.

(57) ABSTRACT

The present invention provides a system and method for testing compliance of a device with a bus protocol. The method comprises the steps of reading a configuration file containing predetermined parameters identifying the type of device and capabilities of the device, and then employing a configuration engine to dynamically generate a test environment for the device by creating selected test components which are coupled via the bus with a representation of the device to form the test environment, the test components being selected dependent on the configuration file. A test sequence is then executed, during which signals passed between the representation of the device and one or more of the test components are monitored to generate result data indicating compliance with the bus protocol. This approach has been found to provide a particularly user friendly and efficient approach for testing compliance of devices with a bus protocol.

18 Claims, 10 Drawing Sheets

TESTING COMPLIANCE OF A DEVICE WITH A BUS PROTOCOL

This application claim priorities to UK Application No. 0109283.2 filed 12 Apr. 2001 and UK Application No. 0111195.4 filed 8 May 2001. The entire contents of these applications are incorporated herein by reference.

BACKGROUND OF THE INVENTION

1. Field of the Invention

The present invention relates to techniques for testing compliance of a device with a bus protocol.

2. Description of the Prior Art

When developing components for integration into a system, a number of test procedures are typically performed to ensure that the component will operate in the desired manner when integrated into the system. Often the system will consist of a number of individual components connected together via one or more buses. The bus specification will often provide a standard interface to each component, and hence enables the component supplier to design and test the component without any knowledge of the system into which the component will finally be integrated.

However, when developing a component for connection within a system to a bus conforming to a particular bus specification, it is clearly necessary to check that the component will interface with the bus in accordance with the defined bus specification.

The development of a hardware component typically takes place in a number of stages. Firstly, the functional operation/behaviour of the component is defined, for example using a Register Transfer Language (RTL). Two popular RTLs used are VHDL and Verilog. In addition, prior to performing such RTL coding, a behavioural model may be built using a UML (Universal Modelling Language) to validate at a transactional level that the design intent is correct.

Once an RTL representation of the hardware component has been developed, this is then synthesised into a sequence of hardware elements using any of a number of known synthesising tools. The result of the synthesis is a hardware design that can then be used to produce the actual hardware component, for example using appropriate fabrication of the component on silicon. It would clearly be very costly to perform test procedures on the component once it has actually been reduced to hardware, and instead rigorous testing of the RTL representation of the component is typically performed to ensure that the actual hardware generated from that RTL representation will operate correctly.

Hence, the process of checking that a component will interface correctly with a known bus specification will typically be applied to the RTL representation of the component to check that it conforms with the bus protocols defined by the bus specification. There are a number of known techniques for performing such protocol checking.

Firstly, an RTL testbench can be created in which the RTL representation of the component to be tested, hereafter referred to as the device under test (DUT), is incorporated. Further, RTL representations of other devices are also prepared and connected together with the RTL representation of the DUT via the bus to form a system simulation within the RTL testbench. Stimuli are then typically driven across the bus from one device to another, with the resulting waveforms observed either by visual inspection, or by a self checking mechanism or module integrated into the system simulation. This process enables transactions defined by the bus protocol to be checked, and typically the checks will be repeated in an exhaustive manner until all bus protocol transactions are score-boarded correctly.

Another technique that may be used for checking for compliance with the bus protocol in an RTL testbench as described above is to build a sophisticated bus follower in RTL, and to then monitor bus traffic ensuring that the state machine inside the bus follower matches that observed in the actual system simulation at any valid point.

Another alternative way of checking for compliance is to use integration test code to cause a master device to perform read and write transactions across the bus to a slave device, and to then check that the target data is read and/or written correctly. A master device can be considered to be a device that is designed to initiate transfer requests via the bus, whilst a slave device can be considered to be a device which is a recipient of such transfer requests. As an example, a processor core may be used as a master device, and arranged to read from memory the integration test code, and to then execute that test code to perform a predetermined sequence of read and write transactions to check compliance with the bus protocols. Such sequences of code can also be executed so as to cause arbitration between devices and to provoke certain responses from devices in order to check other aspects of the bus protocol. This approach is less satisfactory than either of the two earlier described approaches, since it is typically relatively slow, and does not monitor the bus protocol directly, but rather makes assumptions about compliance with the bus protocol by monitoring results of actions invoked via the bus. Nevertheless, this approach is still currently used as a form of testing device interconnection across the bus.

Another known technique for performing protocol checking which may be used as an alternative to the RTL testbench approach described earlier is to use an HVL (High level Verification Language) development tool, for example Vera or Specman, to monitor bus transactions at an abstract level. Instead of having to produce RTL representations of each device within a system simulation, the HVL development tool can be used to model devices without writing them in RTL. It can then monitor the bus transactions by recording abstract information, for example transfer started, transfer in progress, etc.

As will be appreciated by those skilled in the art, when using any of the techniques described above, the process of testing a specific master device or slave device, or a combination of master and slave devices, is a time consuming process, especially considering the numerous configurations and capabilities of each device, for example a master device that can only support incrementing bursts, a slave device that is not capable of accepting write transactions, etc. Considering the first two techniques described, a degree of configuration could be added to the stimulus generation or the RTL bus follower to cater for these parameters, but the RTL testbench will still typically only be able to test a DUT implemented in a particular RTL, for example VHDL or Verilog. Hence, as an example, if a Verilog testbench is built for a Verilog DUT, typically a VHDL testbench for verifying a VHDL version of the DUT will also be required. Further, when certain bus activity is required to be observed such as a bus handover or an early burst termination, this can be quite difficult to provoke without dedicated RTL to perform the task, thus adding to the time required to design and verify a device.

The HVL development tool approach alleviates the problem of RTL language dependence, but a high degree of skill is required to implement the required checking routines. Further, even if such checking routines were implemented as library modules for re-use, configuration and debugging of each checking environment is still required.

According, it would be desirable to provide an improved technique for testing compliance of a device with a bus protocol.

SUMMARY OF THE INVENTION

Viewed from a first aspect, the present invention provides a method of testing compliance of a device with a bus protocol, the method comprising the steps of: (a) reading a configuration file containing predetermined parameters identifying the type of the device and capabilities of the device; (b) employing a configuration engine to dynamically generate a test environment for the device by creating selected test components which are coupled via the bus with a representation of the device to form the test environment, the test components being selected dependent on the configuration file; (c) causing a test sequence to be executed; and (d) monitoring signals passed between the representation of the device and one or more of the test components during execution of the test sequence to generate result data indicating compliance with the bus protocol.

In accordance with the present invention, a configuration file containing predetermined parameters identifying the type of device and capabilities of the device is prepared, and then a test environment is dynamically generated for the device to be tested by creating selected test components which are coupled via the bus with the representation of the device to form the test environment. The test components are selected dependent of the configuration file. A test sequence can then be executed, with the signals passed between the representation of the device and one or more of the test components during execution of the test sequence being monitored to generate result data indicating compliance with the bus protocol.

Hence, in accordance with the present invention, a test environment is automatically generated in the context of the device under test (DUT) as defined in the configuration file. The configuration engine may preferably have access to a variety of different test components which it can then select for inclusion in the test environment dependent on information contained within the configuration file. For example, if the configuration file specifies that the device to be tested is a master device, the configuration engine may be arranged to create and configure within the test environment a decoder, an arbiter, a number of slave devices and a dummy master device. An arbiter is used to arbitrate between requests made by multiple master devices for access to the bus, whilst a decoder is used to identify the slave device to which any particular transfer request issued on to the bus is directed.

The test components are in one embodiment written as object oriented programming (OOP) objects and the step of creating a test component for inclusion in the test environment involves instantiating the test component (i.e. creating an instance of the object) with the methods of the object defining the behaviour of the instantiated test component within the test environment. However, it will be appreciated that there is no requirement to use OOP techniques, and accordingly the test components may be implemented in any other appropriate manner.

When preparing a device for testing in accordance with the technique of the present invention, a user needs to prepare a configuration file containing the parameters that the configuration engine needs to know about in order to dynamically generate a suitable test environment for that device. In preferred embodiments, the configuration file is selected from a set of configuration file templates, the set containing a configuration file template for each type of device, and each configuration file having a number of entries for providing configuration information specific to the device. The configuration information may take a variety of forms but will typically include an identification of the type of the device, and the capabilities of the device. Hence, as an example, the type of the device may be identified as master, slave, arbiter, decoder, etc. The capabilities of the device may, for example, identify the subset of the bus protocol that that device needs to support. Hence, a DUT will not necessarily utilise all of the features of the bus, and accordingly it is not necessary to test for compliance with parts of the bus protocol not used by the device.

In addition to the type of device and capabilities of the device, other configuration information within the configuration file may include a signal map identifying how signal names used within the DUT correspond to the bus specification signal names, along with general testbench parameters relating, for example, to debugging and system environment settings.

It will be apparent that there are a number of processes which may be used to monitor the signals passed between the representation of the device and the one or more test components during execution of the test sequence. In preferred embodiments, the monitoring step comprises the step of employing a protocol checking component to check that signals passed between the representation of the device and one or more of the test components during execution of the test sequence do not violate a set of predetermined rules of the bus protocol. Such protocol checking may involve cycle by cycle checks to ensure that the device being tested obeys the set of predetermined rules. The device being tested must not violate any of these rules if it is to be determined to be compliant with the bus protocol. Typically, the set of predetermined rules is the same irrespective of the device being tested, and accordingly the set of predetermined rules is not influenced by the content of the configuration file in preferred embodiments.

Another monitoring process that can be employed in preferred embodiments comprises the step of employing a coverage monitoring component to monitor signals passed between the representation of the device and one or more of the test components during execution of the test sequence to determine whether a set of coverage points are observed. The coverage points will typically be a list of various bus transactions that must be observed within the test environment before compliance with the bus protocol can be claimed. The aim of coverage points is to ensure that the test sequence or sequences executed have sufficiently exercised the device being tested to ensure that compliance can be claimed.

In preferred embodiments, the set of coverage points is configured dependent on the configuration file read at step (a) of the testing method. Hence, since any particular device being tested may not use all aspects of the bus protocol, the coverage points can be tailored based on the configuration file to identify a set of coverage points relevant to the device being tested. The advantage of using coverage points instead of a standard pre-defined sequence of bus transactions is that such an approach allows for the fact that a particular device may require a specific sequence of transactions in order to fully exercise the bus interface.

In preferred embodiments, both the protocol checking component and the coverage monitoring component are used at step (d) of the testing method, whereby if all coverage points in the set have been observed without violating any of the set of predetermined rules of the bus protocol, the method further comprises the step of generating an output confirming compliance with the bus protocol. The output may take the form of a compliance certificate, for example a check-summed certificate granting compliance with the bus protocol given the original device capability specified in the configuration file.

As mentioned previously, the configuration engine is arranged to create selected test components dependent on the configuration file. In preferred embodiments, the test components to be created are selected in dependence on the type of device to be tested, the device type being specified within the configuration file.

Further, in preferred embodiments, at least one of the test components has associated therewith a plurality of behaviours that it may exhibit, the choice of behaviour being determined when that test component is created dependent on the type of device to be tested. For example, if the device being tested is a slave device, and a decoder is created as one of the test components, this may in preferred embodiments incorporate behaviour that enables it to de-select the device being tested to enable an alternative slave to be selected. This is clearly a useful behaviour to include within the decoder when testing slave devices. However, if the device being tested is a master device, then this behaviour of the decoder is not relevant, and can be omitted from the overall behaviour of the decoder test component. As mentioned earlier, in preferred embodiments each test component is written as an OOP object, and instantiations of those objects are then created by the configuration engine when generating the test environment. In such embodiments, the plurality of behaviours can be implemented as individual methods of the OOP object, with the method(s) applicable to any instantiation being selected when that instantiation is created, this being referred to as "inheritance" in OOP terminology.

It will be appreciated that the test sequence that the testing method causes to be executed at step (c) may take a variety of forms. For example, the test sequence may be chosen from a predetermined set of test sequences. However, in preferred embodiments, the test sequence is a user-defined test sequence developed specifically for the device to be tested, with the aim of testing compliance with those parts of the bus protocol relevant to the particular device being tested. Steps (c) and (d) of the testing method may be repeated iteratively, with different or modified test sequences being invoked each time at step (c) until sufficient transactions have been monitored to enable a determination of compliance with the bus protocol to be made.

It will be appreciated that the representation of the device can be incorporated into the test environment in a number of ways. However, in preferred embodiments, the representation of the device is created within an interface module, and said step (b) of generating the test environment includes mapping signals within the interface module to signals within the test environment, the mapping being defined within the configuration file. The interface module acts as a "wrapper" around the representation of the device and presents an interface to the rest of the test environment.

Typically, the representation of the device will not be the only element within the interface module. For example, certain clocking and mixing functions may be provided as part of the interface module, and indeed in certain embodiments other device representations may be included in the interface module. Accordingly, in preferred embodiments of the present invention, the configuration file identifies a level of hierarchy of the representation of the device within the interface module to facilitate the mapping of signals.

Preferably, the method further comprises the step of providing a trickbox component compatible with the bus protocol and provided with a general-purpose input/output interface. The trickbox allows signals not related to the bus protocol but relevant to the device under test to be controlled and observed. The trickbox typically has an input and an output port to enable such signals to be input and output, as well as being provided with a slave interface to the bus to control the trickbox. The slave interface means that the trickbox can be instantiated in the test environment and be controlled using test sequences which access the trickbox rather than the device under test. In preferred embodiments, the trickbox is included within the interface module containing the representation of the device to be tested. It will be appreciated that in certain implementations a plurality of trickbox components may be incorporated to facilitate different testing procedures.

As mentioned previously, the type of device that may be tested preferably is either a master, a slave, an arbiter of a decoder. In preferred embodiments, the bus protocol is the ARM AMBA bus protocol, the bus comprises a system bus and a peripheral bus, and the type of device which may be tested comprises a system bus master, a system bus slave, a peripheral bus master, a peripheral bus slave, an arbiter or a decoder. It will be appreciated by those skilled in the art that the peripheral bus master is a bridge interconnecting the peripheral bus with the system bus.

The representation of the device that is incorporated into the test environment may take a variety of forms. However, in preferred embodiments, the representation of the device is a Register Transfer Language (RTL) representation.

Viewed from a second aspect, the present invention provides a computer program operable to configure a processing unit to perform a method of testing compliance of a device in accordance with the first aspect of the present invention. The present invention also provides a carrier medium comprising a computer program in accordance with the second aspect of the present invention.

Viewed from a third aspect, the present invention provides a data processing system for testing compliance of a device with a bus protocol, the system comprising: memory for storing a configuration file containing predetermined parameters identifying the type of the device and capabilities of the device; and a processing unit arranged to perform the steps of: (i) dynamically generating a test environment for the device by creating selected test components which are coupled via the bus with a representation of the device to form the test environment, the test components being selected dependent on the configuration file; (ii) executing a test sequence; and (iii) monitoring signals passed between the representation of the device and one or more of the test components during execution of the test sequence to generate result data indicating compliance with the bus protocol.

Whilst the invention has been described in terms of a single device being tested, it will be appreciated that there is nothing in principle to stop the method being applied to the simultaneous testing of multiple devices.

The present invention provides for the dynamic generation of a test environment for a device to be tested, the test environment being generated based on information contained within a configuration file pertaining to the device being tested. This testing method will be referred to herein as an "active" mode. However, in preferred embodiments, the software tool used to provide the described testing method is also able to be used in a compatible manner with legacy simulation environments where a system simulation environment already exists, and accordingly there is no requirement for the dynamic generation of a test environment. This mode will be referred to herein as a "passive" mode of operation. In such a mode of operation, a configuration file is still specified, and is used when configuring the processes used to monitor the signals passed between the various devices within the system simulation environment during testing.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

For the purpose of illustrating a preferred embodiment of the present invention, the testing of a device to be connected to a bus operating in accordance with the "Advanced Microcontroller Bus Architecture" (AMBA) specification developed by ARM Limited will be considered. Before discussing in detail the testing procedures, a brief illustration of an implementation of a device incorporating buses operating in accordance with the AMBA specification will be given with reference to FIG. 1.

Figure 1:
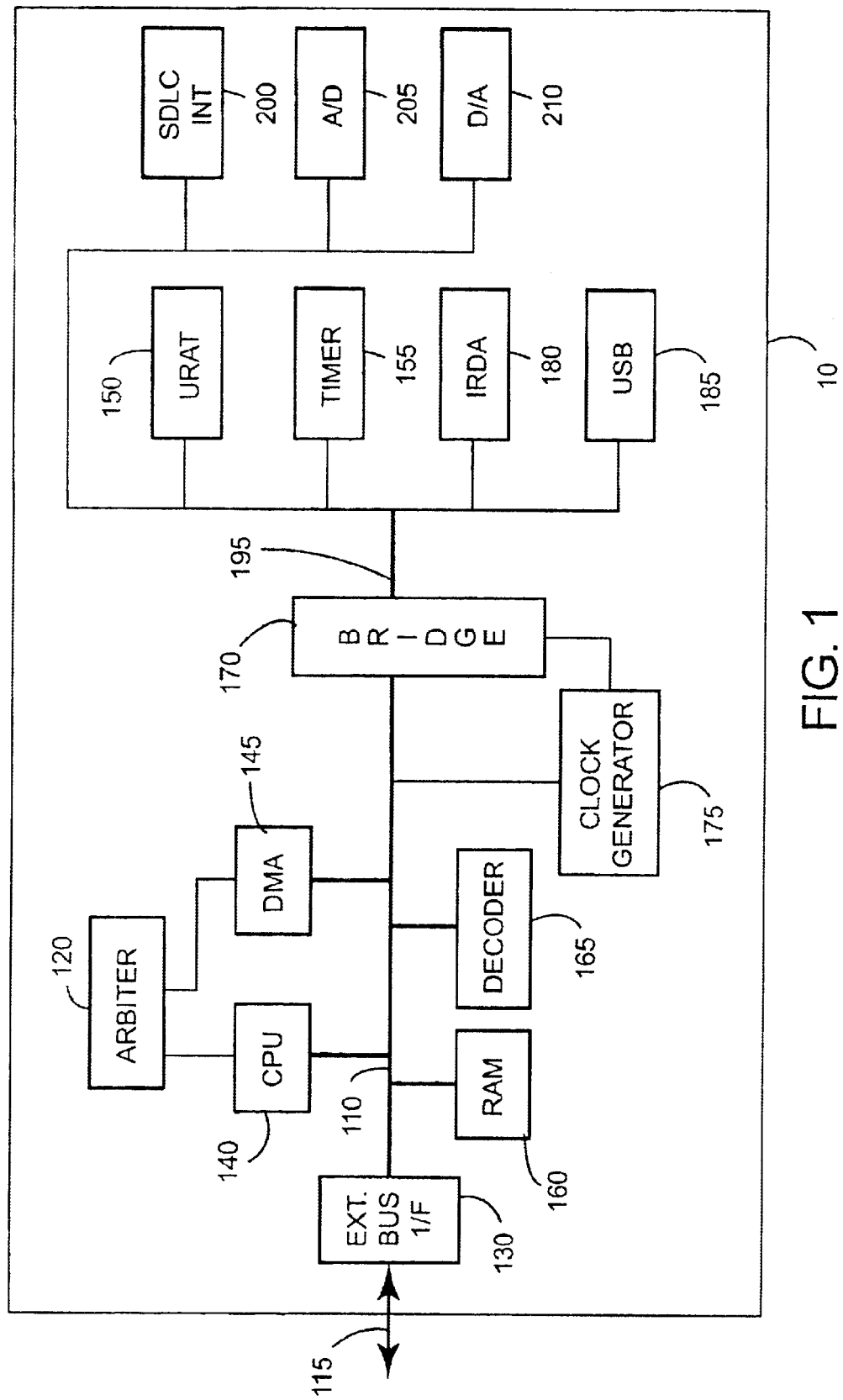
FIG. 1 is a block diagram illustrating a System on Chip incorporating devices interconnected via a bus operating in accordance with the Advanced Microcontroller Bus Architecture specification developed by ARM Limited.

FIG. 1 illustrates an integrated circuit taking the form of a microcontroller chip or System on Chip (SoC) 10, which may be used within a device such as a personal organiser, a mobile phone, a television set top box, etc. The chip 10 has a system bus 110 (also referred to herein as an AHB) and a peripheral bus 195 (also referred to herein as an APB) connected via a bridge circuit 170. These buses operate in accordance with the AMBA specification. The AMBA specification defines an on-chip communication standard for designing high performance 32-bit and 16-bit embedded microcontrollers, with the system bus 110 being used for high performance system modules, whilst the peripheral bus is used for low power peripheral devices. The high performance system bus 110 is able to sustain the external memory bandwidth, with the CPU and other Direct Memory Access devices residing on the system bus, whilst a bridge circuit 170 connects the system bus to a narrower peripheral bus 195 on which the low bandwidth peripheral devices are located. The bridge circuit 170 performs the necessary protocol conversion between the system bus 110 and the peripheral bus 195.

The chip 10 may have a number of master logic units connected to the system bus 110, for example a CPU 140 and a DMA controller 145. For the purpose of the current description, the term "master" logic unit is used to refer to a logic unit that is designed to initiate processing requests, whilst logic units that are designed to be recipients of such processing requests will be referred to as "slave" logic units. Only one of the master logic units may have access to the system bus at any particular instance in time, and hence an arbiter 120 is provided to control access to the system bus 110 by the various master logic units. When a master logic unit wishes to have access to the system bus 110, it issues a bus request signal to the arbiter 120. If only one bus request signal is received by the arbiter 120 at any particular instance in time, it will grant access to the master logic unit that issued that bus request signal. However, if more than one bus request signal is received by the arbiter at any particular instance in time, the arbiter is arranged to apply predetermined priority criteria in order to determine which master logic unit should have access to the system bus 110. Of all of the master logic units requesting access to the bus, the arbiter 120 is arranged to grant access to the master logic unit having the highest priority.

In addition to the master logic units, one or more slave logic units may be connected to the system bus 110. For the sake of clarity, only one slave logic unit, namely the Random Access Memory (RAM) 160 is illustrated in FIG. 1. When a transfer request is issued to a slave logic unit, an address will be output on the system bus 110, and this will be decoded by the decoder logic 165 in order to determine which slave logic unit is to handle the transfer request. The decoder will then notify the appropriate slave logic unit accordingly.

The system bus 110 is also connected to an external bus 115 via an external bus interface 130. In preferred embodiments the external bus 115 is a 32-bit vector bus.

Further, a clock generator 175 is provided to control the frequency of operation of the various logic units connected to the system bus 110. Hence, the timing of transfer request signals output by a master logic unit is determined by the clock frequency of the clock generator 175.

A number of peripheral devices may be connected to the peripheral bus 195. Examples of such peripheral devices are a "Universal Asynchronous Receive and Transmit" (UART) logic unit 150 for receiving and transmitting serial data, a timer 155 used, for example, to generate interrupts, an Infrared Data Association (IrDA) interface 180 used for short range high speed Infrared communication, a Universal Serial Bus (USB) 185, a Synchronous Data Link Control (SDLC) interface 200, and analog-to-digital (A/D) and digital-to-analog (D/A) converters 205 and 210.

In the microcontroller chip 10 illustrated in FIG. 1, the peripheral bus 195 is arranged to operate at the same clock speed as the system bus 110. Hence, the clock signal generated by the clock generator 175 for the system bus 110 is also passed to the bridge 170, which is arranged to generate the necessary clock signals to control the operation of the peripheral units 150, 155, 180, 185, 200, 205 and 210.

When a master logic unit 140, 145 issues a processing request on to the system bus 110 for handling by a peripheral unit connected to the peripheral bus 195, the bridge 170 will receive the processing request signal, will determine which peripheral unit 150, 155, 180, 185, 200, 205 or 210 the processing request is directed to, and will then output the processing request to the appropriate peripheral unit along with the necessary clock signals to control the operation of that peripheral unit. Additionally, prior to outputting the processing request on to the peripheral bus, any necessary protocol conversion steps will be taken by the bridge 170 to convert between the protocol used by the system bus 110 and the protocol used by the peripheral bus 195.

With the structure illustrated in FIG. 1, multiple peripheral units can be connected to the peripheral bus 195 without loading the main system bus 110, and the peripheral bus 195 is only used when a peripheral unit needs to be accessed, thereby reducing overall power consumption.

The AMBA specification is intended to allow the rapid building of SoC devices by the integration of a number of different components. The AMBA specification enables this process by providing a standard interface, which allows the developer of each individual component to design and test that component (also referred to herein as the Device Under Test (DUT)) without any knowledge of the system into which the component will be finally integrated. Accordingly, as an example, the CPU 140 of FIG. 1 can be designed for integration into the SoC 10 without the designer needing to know what other devices will be incorporated into the SoC 10.

However, when designing an individual device for later incorporation into an SoC using buses conforming to the AMBA specification, it is clearly important for the designer to carry out tests to ensure that that device will conform to the bus protocol specified by the AMBA specification. Indeed, the SoC integrator will typically wish to have some proof that an individual device is compliant with the AMBA bus protocol in order to give that integrator confidence that the component will function correctly when integrated into the rest of the SoC design.

Figure 2:
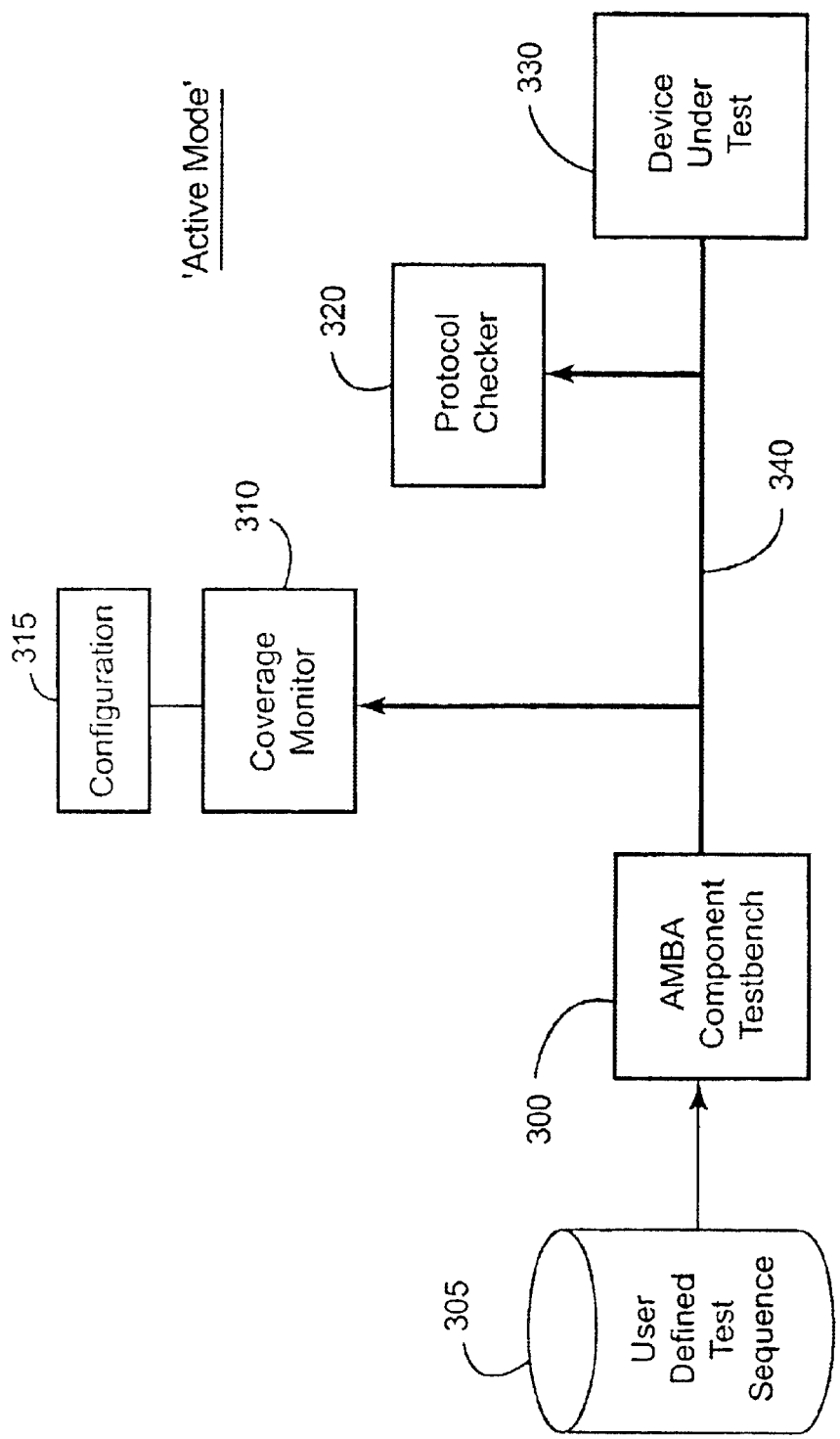
FIG. 2 is a block diagram schematically illustrating the logical elements used when performing a testing procedure in accordance with an active mode of preferred embodiments of the present invention.

FIG. 2 is a block diagram schematically illustrating the logical elements provided for testing compliance of a DUT with the AMBA bus protocol in an active mode of preferred embodiments of the present invention. As illustrated in FIG. 2, the DUT 330 is connected via a bus 340 to an AMBA component testbench 300 used to generate a test environment for the DUT 330. In preferred embodiments, the AMBA component testbench is implemented in software, and is arranged to read stimulus generation and response checking information from a user defined test sequence file 305, this file being provided by the user having regard to the DUT 330 with the aim of testing the compliance of the DUT with those parts of the AMBA bus protocol that it will be utilising.

The simulation environment illustrated in FIG. 2 also contains a protocol checking component 320 and a coverage monitoring component 310. The protocol checking component 320 is arranged in preferred embodiments to perform cycle by cycle checks to ensure that the DUT 330 obeys the rules within the AMBA specification. The protocol checks are a fixed set of rules from the AMBA specification and a DUT must not violate any of those rules in order to claim compliance with the AMBA specification. These rules must be obeyed whatever the type of the DUT 330, and accordingly there is no configuration of the protocol rules dependent on the DUT 330.

It will be appreciated by those skilled in the art that for any particular bus protocol, there will typically be a significant number of such rules which will need to be checked. An example of an AMBA AHB master protocol rule is "In the second cycle of a Split or Retry response the master must drive HTRANS to IDLE". A Split or Retry response is a response from a slave device to the master device indicating that the slave device cannot deal with the transfer request from the master at the current time. The HTRANS signal is a control signal issued by a master to indicate the type of bus transfer that the master is performing, for example non-sequential, sequential, idle or busy. An idle transfer needs to be asserted in the cycle following a Split or a Retry response in order to give the slave device the opportunity to return to a state in which it is ready to receive another transfer request, before a retry of the transfer request is attempted.

The coverage monitoring component 310 is used to monitor signals passed between the DUT 330 and any of the other test components within the test environment generated by the AMBA component testbench 300 during execution of the test sequence 305 to determine whether a set of coverage points are observed. The coverage points are a list of various bus transactions that must be observed within the test environment before compliance can be claimed. Hence, the aim of coverage points is to ensure that the tests have sufficiently exercised the DUT before compliance can be claimed. An example of a coverage point is "The bus slave must be accessed by a read transfer followed immediately by a write transfer to the same address".

It will be appreciated that the required coverage points to be observed will depend on the DUT 330. For example, a master DUT will interface with the bus in a different way to a slave DUT, and hence the various bus transactions that must be observed to ensure compliance will be different for either type of DUT. Accordingly, the coverage monitoring component 310 is configured in accordance with configuration information 315 derived having regard to the particular DUT 330 being tested.

Accordingly, it can be seen that the advantage of using coverage points, instead of a standard pre-defined sequence of bus transactions, is that coverage points allow for the fact that a particular DUT may require a specific sequence of transactions in order to fully exercise the bus interface.

It should be noted that the protocol checking component 320 and the coverage monitoring component 310 do not automatically check the integrity of the actual data being transferred during compliance tests. The user should ensure that the DUT operates correctly during a compliance run. However, when configured as in FIG. 2, the simulation environment aids in the operational testing of the DUT by supporting "data checking commands" in the user defined test sequence input file. For example, when data is stored to a slave DUT, and subsequently read back from the slave DUT, the user defined test sequence can identify the value of the data that is expected to be returned from the slave DUT, and this can be checked to ensure correct operation.

As will be described in more detail, when using the simulation environment in the active mode illustrated schematically in FIG. 2, the user preferably supplies the user defined test sequence 305, an RTL implementation of the DUT 330, and a user configuration file providing configuration information specific to the DUT. These three items are in preferred embodiments supplied through an application programming interface (API) of the testbench, which then generates the test environment. This process will be described in more detail later.

The above described active mode of operation removes the need for the user to generate RTL models for the various other components that are required to interact with the DUT 330 in order to test its compliance with the bus protocol. In preferred embodiments, the testbench API of preferred embodiments is implemented within a compliance tool which is then interfaced with a known High level Verification Language (HVL) simulation tool, for example Vera or Specman. The presence of the compliance tool, and the configuration API forming part of that tool, enables the dynamic generation of the test environment based on the inputs provided by the user, namely the user configuration file, the user defined test sequence, and the RTL implementation of the DUT. The compliance tool hence removes the need for the high degree of skill that would otherwise be required to implement the required checking routines using the HVL simulation tool, and removes the need for configuration and debugging of each checking environment.

Figure 5:
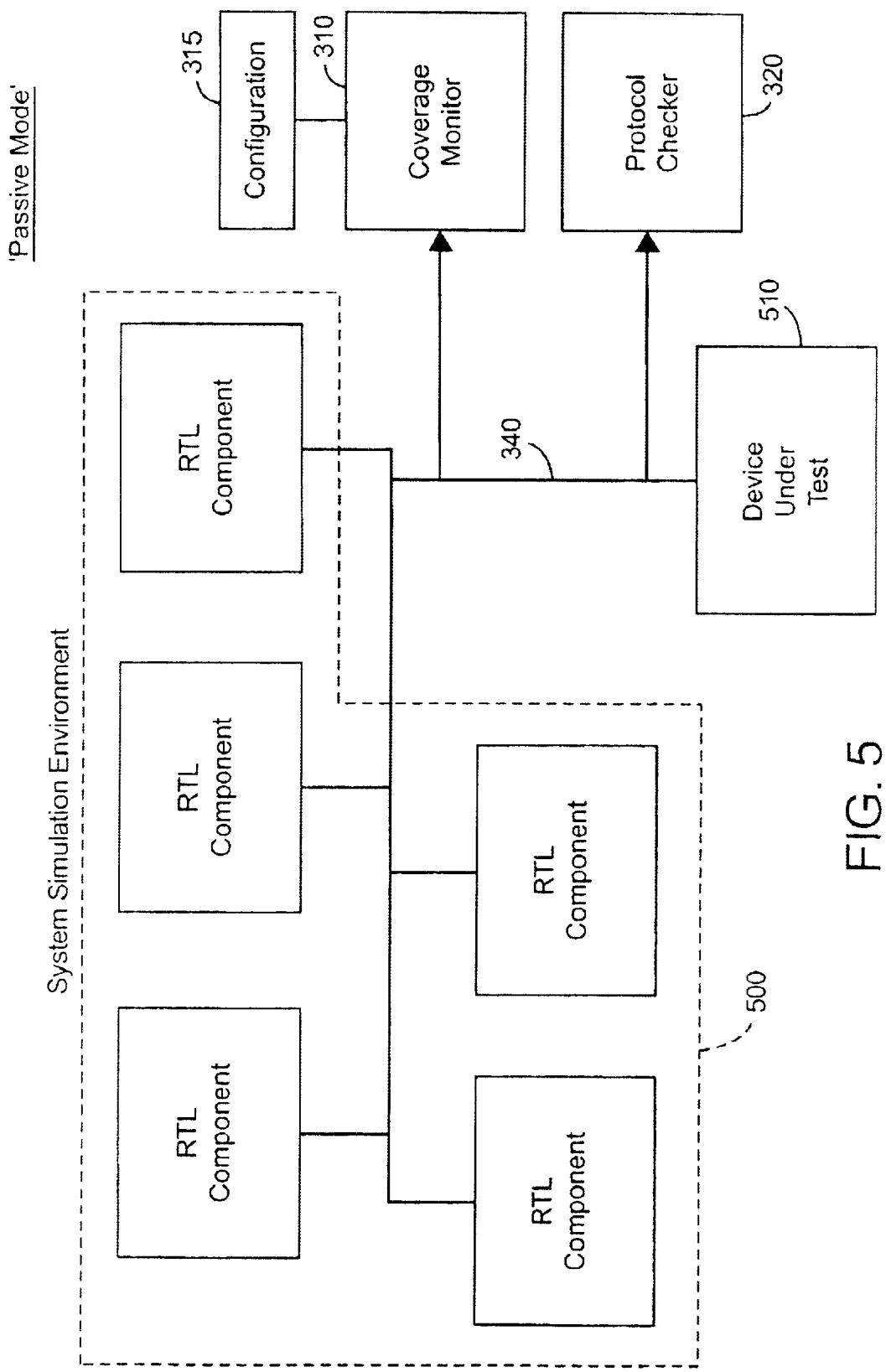
FIG. 5 is a block diagram schematically illustrating the logical elements used when performing testing in accordance with a passive mode of preferred embodiments of the present invention.

Whilst the active mode of the compliance tool as described above with reference to FIG. 2 is clearly beneficial when creating a DUT 330 from scratch, there may be a number of situations in which the user already has a fairly well developed system simulation environment, for example including a number of RTL implementations of components interlinked via the bus. In preferred embodiments, to enable such system simulation environments to be used, the compliance tool also supports a passive mode of operation as illustrated in FIG. 5. As shown in FIG. 5, the pre-existing system simulation environment 500 can be loaded into the compliance tool, and connected to the DUT 510 via the bus 340. The coverage monitor 310 and protocol checker 320 are still retained to perform the necessary checking of the signals passed between the various devices during testing, and again the coverage monitor 310 can be configured based on configuration information 315 relating to the DUT 510. Hence, in the FIG. 5 passive mode embodiment, the user now supplies through the configuration API a user configuration file, the pre-existing system simulation environment 500, and a RTL implementation of the DUT 510.

Hence, in summary, the compliance tool of preferred embodiments can be configured to operate either in an active mode as illustrated in FIG. 2 or a passive mode as illustrated in FIG. 5, with a configuration API being provided to enable the user to input the necessary information to specify these two different configurations.

Figure 3:
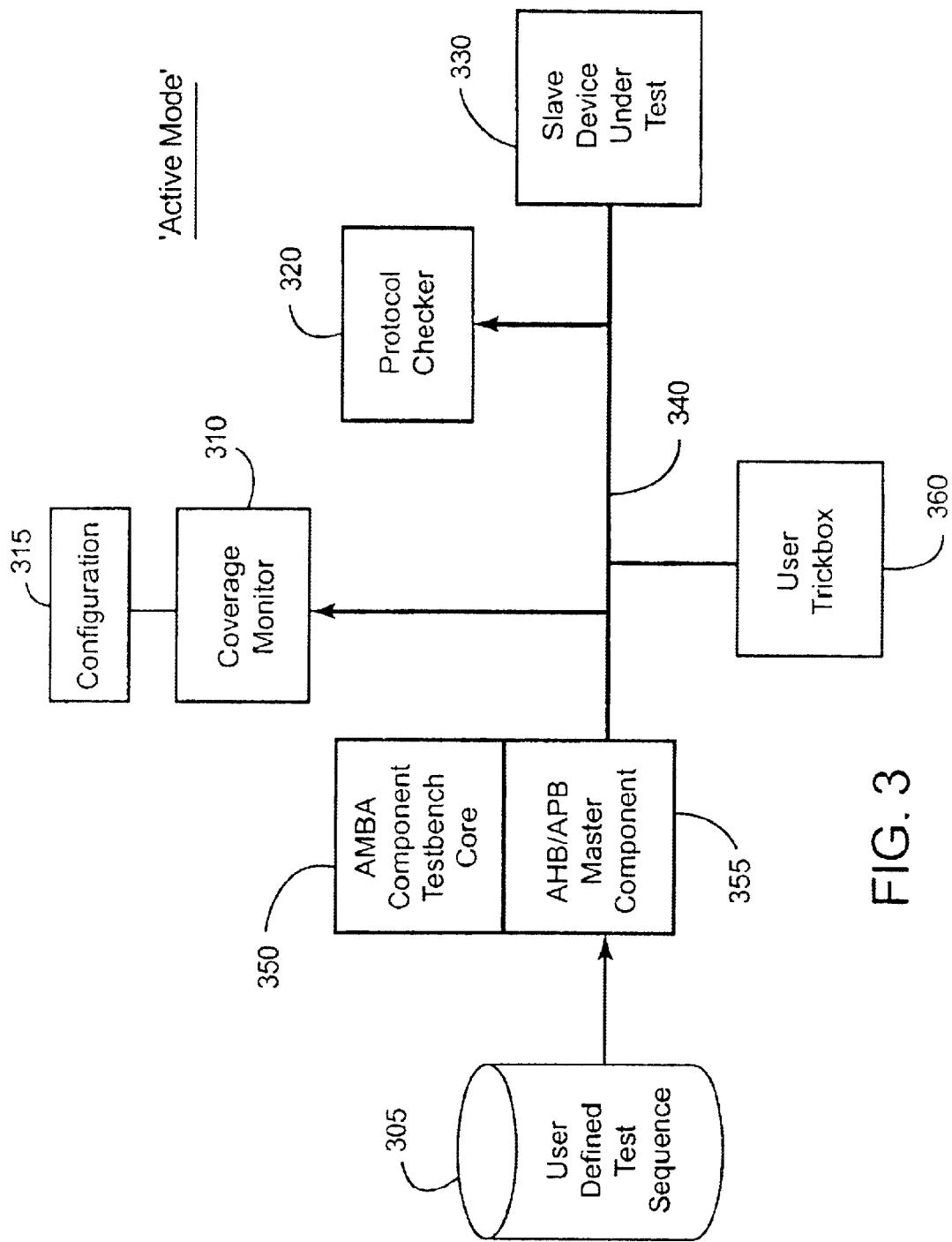
FIG. 3 is a block diagram illustrating more detail of the logical elements used in the active mode of preferred embodiments when testing a slave device.
Figure 4:
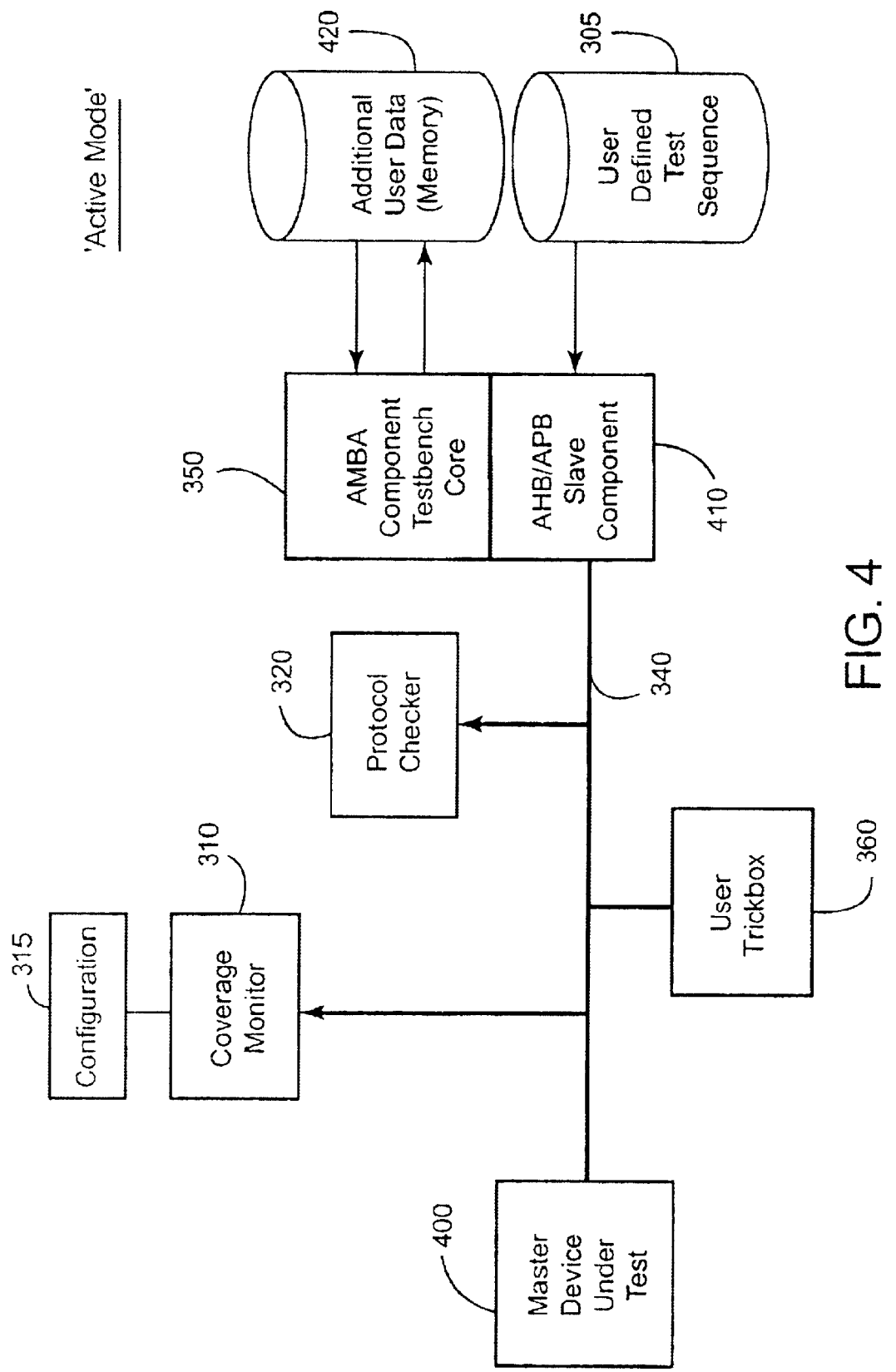
FIG. 4 is a block diagram illustrating more detail of the logical elements used in an active mode of preferred embodiments when testing a master device.

Two example implementations of the active mode configuration are illustrated in FIGS. 3 and 4. In preferred embodiments, active mode configurations will support the following devices: AHB master, AHB slave, APB master (i.e. a bridge), APB slave, arbiter and decoder. FIG. 3 shows an active mode configuration in which the DUT 330 is a slave DUT. In this configuration, a configuration engine within the AMBA component testbench core 350 of the compliance tool will dynamically generate a suitable AHB/APB master component 355, along with any other test components which may be required, for example a decoder. The slave DUT 330 accesses the bus as if it were responding to a master device. However, the test environment created around it drives directed responses as dictated by the user defined test sequence 305. The protocol checking component 320 and the coverage monitoring component 310 then monitor the signals passed over the bus during execution of the test sequence to generate result data indicating whether the slave DUT complies with the bus protocol.

In preferred embodiments, a user trickbox component 360 is also provided which is mixed in with the slave response signals to enable additional behaviour. The user trickbox 360 is in preferred embodiments written in RTL and instantiated within an interface module containing both the user trickbox 360 and the slave DUT 330. As will be described in more detail later, the interface module is then interfaced with the remainder of the test environment as generated by the compliance tool through appropriate mapping of signals. The RTL trickbox 360 can then interface with the DUT 330 to allow non-AMBA signals of the DUT to be controlled and observed.

The trickbox of preferred embodiments has a 32-bit output port and a 32-bit input port, as well as a standard AHB/APB slave interface to control the trickbox. The AHB/APB interface enables the trickbox to be instantiated in the testbench and controlled by using test vectors that access the trickbox rather than the DUT. As used in this context, the term "vector" refers to an element of the user defined test sequence 305 that defines the status of the bus at a particular time and/or an action to perform on the bus. As an example of the additional behaviour that may be introduced using the trickbox 360, if we assume that the active mode of FIG. 3 is an AHB active mode, then the trickbox 360 may be used to provide waited responses as another slave device, with a decoder test component being used to deselect the slave DUT 330 whilst the trickbox slave device is selected.

FIG. 4 illustrates an alternative active mode implementation for testing a master DUT 400. In this arrangement, the configuration engine within the AMBA component testbench core 350 of the compliance tool will be used to generate an AHB/APB slave component 410 along with any other test components required, for example an arbiter, a decoder and a dummy master. Depending on the configuration and/or type of the DUT, certain additional facilities may also be enabled from the compliance tool. For example, in the case of an AHB master configuration, a behavioural memory-slave device is preferably generated that has a memory initialisation file 420, which itself generates a memory-dump file of the same format. The memory dump file is a file representation of the contents of the memory model implemented within the testbench core 350, and is created after a test completes. If no modifications are made to the memory model during a test, then the resulting memory dump file will have the same contents as the memory initialisation file.

The master DUT 400 of FIG. 4 accesses the bus as if it were communicating to a slave device. However, the test environment created around it drives back directed responses as defined by the user defined test sequence 305. As with the FIG. 3 example, a user trickbox component 360 can be provided which is mixed in with the slave response signals to enable additional behaviour.

From the above description of the active mode, it can be seen that the active mode configuration of the compliance tool greatly reduces the burden of having to generate a point-solution testbench for each DUT, the compliance tool itself generating all of the necessary AMBA "fabric" around the DUT in order to allow user supplied stimulus to be provided during the process of compliance testing.

In contrast, the earlier described passive mode is aimed primarily at an in-system test environment, passive mode effectively disabling the concept of dynamic generation of the AMBA fabric by the compliance tool, and disabling the stimulus-driving capabilities, that are otherwise available in active mode. As mentioned earlier, the same user configuration file is preferably used for specifying details about the DUT itself. In the passive mode however, any active mode specific configuration options are ignored.

Passive mode is also ideal for verifying legacy designs, as the user does not need to isolate the DUT into an active mode testbench for compliance testing. It should be noted however that achieving full coverage is possibly more challenging in passive mode, if the source of stimulus to the DUT has a limited transaction or scenario generating capability (i.e., it will typically not be as tailored to the DUT as the user defined test sequence used in active mode would be). A more likely scenario would be to use the passive mode to ensure that the DUT did not generate any AMBA protocol violations over the course of a sequence of test runs.

In either mode of operation, the compliance tool preferably generates a coverage report for optional viewing at the end of a test run. This is preferably in the form of a graphical user interface (GUI) that displays both the completed and outstanding compliance coverage goals associated with the DUT and its particular capabilities configuration. It is from this data that an AMBA compliance certificate can be generated. In preferred embodiments, the AMBA compliance certificate will identify the AMBA specification revision number, the compliance configuration, and an explanation of any compliance coverage points not tested. In preferred embodiments, the compliance tool also enables the test environment for the DUT, along with any required test vectors, to be output to enable a user to repeat the compliance test.

As mentioned earlier, in preferred embodiments the compliance tool is preferably run in combination with a standard HVL simulation tool. The process by which the simulation tool and the compliance tool operate together to perform a compliance check will now be discussed in more detail with reference to the flow diagrams of FIGS. 6 and 7.

Figure 6:
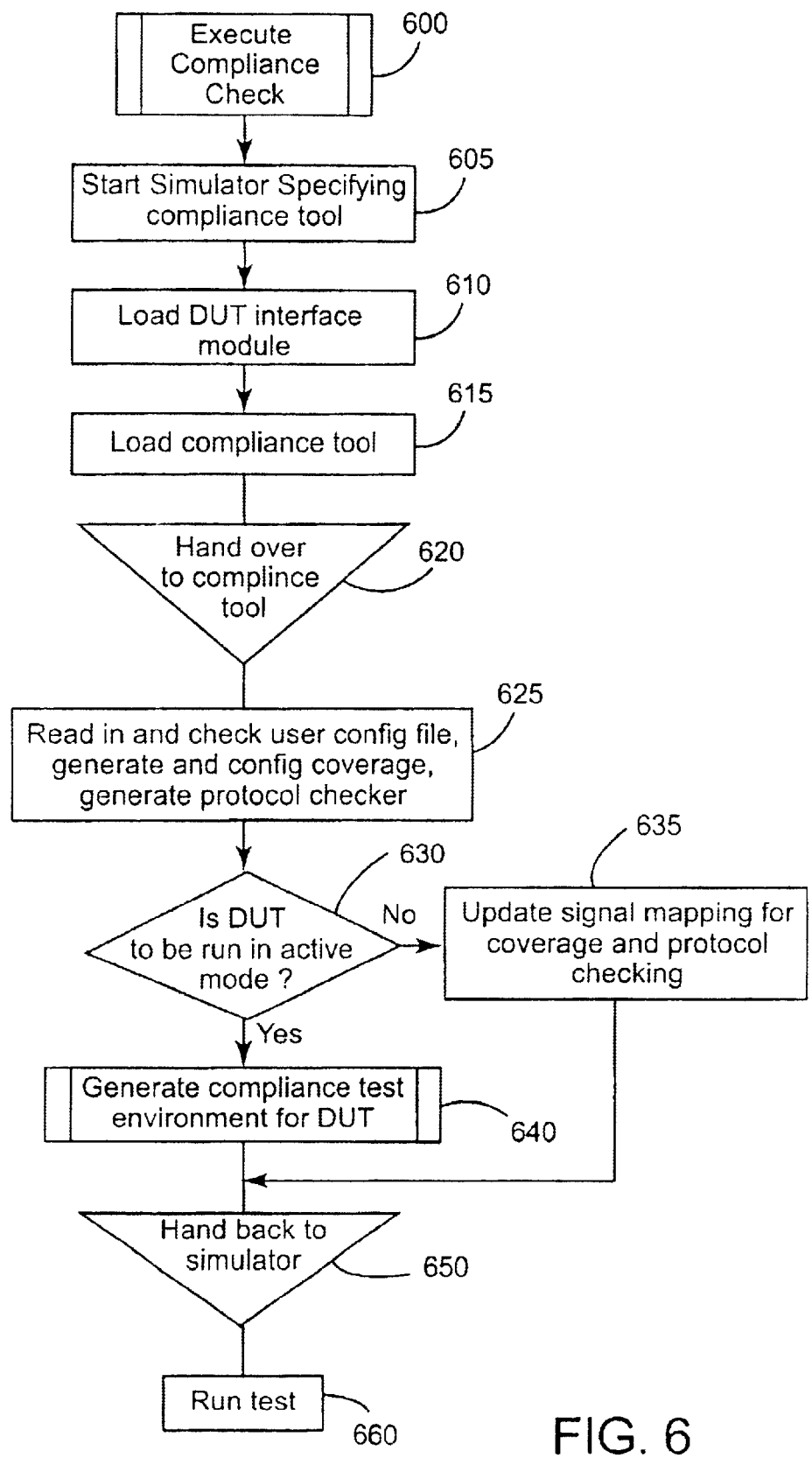
FIG. 6 is a flow diagram illustrating the steps performed to execute a compliance check in accordance with preferred embodiments of the present invention.

As shown in FIG. 6, the compliance check begins at step 600, and proceeds to step 605 where the simulator tool is started. When the simulator tool is started, it will specify that the compliance tool is to be used. The process then proceeds to step 610, where the DUT interface module is loaded. As described earlier, the interface module is a module into which the RTL representation of the DUT is instantiated. In preferred embodiments, the interface module will also include an RTL representation of a user trickbox. Additionally, the interface module may also provide optional clock and reset signals, along with associated signal mixing between RTL and the compliance tool test environment itself. Hence, the interface module can be viewed as a simple RTL top-level module which interfaces to the compliance tool test environment that, in active mode, is dynamically created at simulation time depending on a user configuration file supplied.

At step 615, the compliance tool is loaded, this incorporating the configuration API used to configure the tool in either active or passive mode, along with the coverage monitoring and protocol checking functions. At step 620, the simulation tool then hands over processing to the compliance tool, after which the process proceeds to step 625.

At step 625, the compliance tool reads in and checks a user configuration file provided by the user through the configuration API. In preferred embodiments, for each compliance tool operational mode, for example AHB_master, AHB_slave, APB_master, APB_slave, arbiter or decoder, template user configuration files are provided. Accordingly, if the user is providing an AHB master device for test, then the user will choose the AHB_master template user configuration file. The configuration file will contain predetermined parameters identifying configuration information specific to the device. At least some of these entries will need to be entered by the user having regard to the specific device being tested. In preferred embodiments, entries are provided within the configuration file to specify:

1. DUT name and optional ID;
2. HDL path/level of hierarchy of the DUT in the design;
3. DUT signal map, for example HCLK=HCLKsys, or HCLK=~/top/HCLK to override 2 above;
4. General testbench parameters, for example ENDIANESS=LITTLE, ERRORSTOP=YES, VERBOSITY=ERRORS_ONLY; and
5. Coverage configuration, for example DIRECTION= NO_WRITE for devices that are read only.

An example of a user configuration file for an AHB master DUT is provided below:

```
;--------------------------AHB Master DUT Settings----------------------------
[AHB_MASTER]
NAME       = ARM7TDMI,1          ; Note :  NAME, MASTER_ID : default MASTER_ID=0
                                 ;         MASTER_ID refers to Arbiter HMASTER[3:0]
                                 ;         signal, end should be in range 0..15
HDLPATH    = ~/TBEasy/uEASY/uA7TDMI
HCLK       = HCLK                ; Clock inout
HRESET     = HRESETn              ; Reset inout
HGRANT     = HGRANTarm            ; Grant input from Arbiter
HREADY     = HREADYin             ; Ready input from Bus
HRESP      = HRESPin              ; Response input from Bus
HRDATA     = HRDATAin             ; Data input from Bus
HADDR      = HADDRout             ; Address to Decoder
HTRANS     = HTRANSout            ; Transfer type to Bus
HWRITE     = HWRITEout            ; Write flag to Bus
HSIZE      = HSIZE                ; Data Size to Bus
HBURST     = HBURST               ; Burst Type to Bus
```

-continued

```
HWDATA      = HWDATAout              ; Write Data to Bus
HBUSREQ     = HBUSREQarm             ; Bus request to Arbiter
HLOCK       = HLOCKarm               ; Lock signal to Arbiter
HPROT       = HPROT                  ; Prot. Control to Bus
; Active/passive mode (Active : ACT drives DUT, Passive: externally driven DUT)
actmode = passive
stimulus=memory.vec, peripheral.vec
inputfilecheck=yes
; Passive mode signal list
ARBITER_HSPLIT      = ~/TBEasy/uEASY/uArbiter/HSPLIT
ARBITER_HMASTER     = ~/TBEasy/uEASY/uArbiter/HMASTER
ARBITER_HMASTLOCK   = ~/TBEasy/uEASY/uArbiter/HMASTLOCK
; General parameters
verbosity   = FULL
endianess   = LITTLE
datawidth   = 32
errorstop   = YES
stoprun     = 0x20000000, 4
; Memory and Peripheral slave functionality
hreadyconfig = USER_WAIT             ; User directed, contained in peripheralfuncs
hrespconfig  = USER_RESP             ; User directed, contained in peripheralfuncs
arbiterconfig = ALWAYS_GRANT
bursttypes   = NO_SINGLE|NO_WRAP4|NO_INCR4|NO_WRAP8|NO_INCR8|NO_WRAP16|NO_INCR16
                                     ; INCR only supported on ARM7TDMI cores
xfersize    = NO_64                  ; Not strictly required as limited by datawidth
busyxfer    = NO_BUSY                ; Does not support BUSY transfers
;------------------------------------------------------------------------------
```

From the above, it can be seen that the first entry in the file identifies the name of the device to be tested, here an ARM processor core. The second entry "HDLPATH" identifies the level of hierarchy of the DUT. There are then a number of entries identifying all of the signals that will be used by the master DUT, and identifying how the names used within the DUT should be mapped to the AMBA signal names. For example, the signal HWRITEout used by the DUT is mapped to the AMBA bus signal HWRITE.

The next entry in the configuration file then identifies whether the device is to be tested in active or passive mode, here it being confirmed that passive mode is to be used. The next entry identifies the user defined test sequences to be used as stimuli. In this example, two test vector files are identified, namely memory.vec and peripheral.vec. With reference to FIG. 4, the vector file peripheral.vec is the user defined test sequence 305, and the vector file memory.vec contains the data to be placed in the memory 420. When the test is initiated, the processing core DUT will read the data from the memory 420, this data specifying a sequence of instructions to be executed by the core. This will cause bus transfers to take place over the bus 340, with the user defined test sequence 305, namely peripheral.vec in this example, dictating the responses provided by the slave test component. This entry also specifies whether the input file is to be checked for syntax before commencing a test run.

In preferred embodiments, the format of the stimulus vector file is specifically designed such that they can either be hand-written, or more conveniently auto-generated using languages such as Perl or C.

The next entry in the user configuration file specifies some extra signals that are used specifically for passive mode. There then follows some general parameters providing debugging and system environment settings relevant to the test. For example, in the specific example, it is specified that the bus width is 32 bits.

There then follows three entries providing configuration information specific to active mode. Finally, the last three entries in the file identify capabilities of the device, which will be used, for example, in determining the coverage points to be checked by the coverage monitor.

Returning to FIG. 6, once the user configuration file has been read in and checked, the compliance tool then generates the protocol checking component and generates and configures the coverage monitor component. As mentioned above, the configuration of the coverage monitor will take account of the capabilities of the device as specified in the user configuration file.

The compliance tool then determines at step 630 whether the DUT is to be run in active mode, as mentioned earlier, this information being provided within the user configuration file. If the DUT is to be run in passive mode, then the process branches to step 635, where the signal mapping for the coverage and protocol checking is performed. This is done using the signal mapping information provided in the user configuration file. The process then branches back to the simulator tool at step 650, after which the test is then run at step 660. In the passive mode, this test will be defined within the pre-existing system simulation environment.

If, however, it is determined at step 630 that the DUT is to be run in active mode, the process proceeds to step 640, where the test environment for the DUT is dynamically generated by the compliance tool. This process is illustrated in more detail with reference to FIG. 7.

Figure 7:
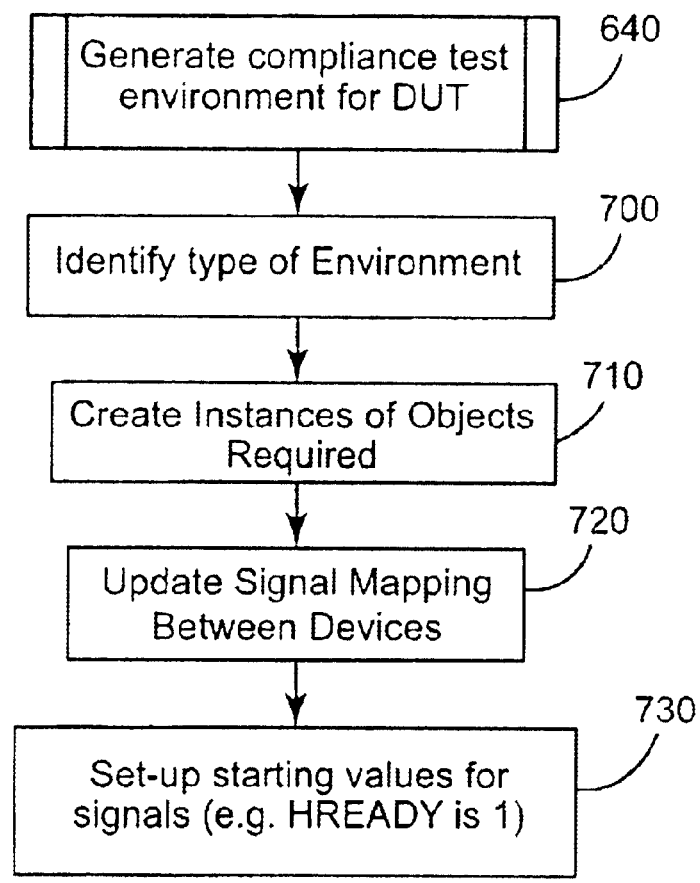
FIG. 7 is a block diagram illustrating in more detail the process of generating a compliance test environment for the device under test.

As shown in FIG. 7, the first step (step 700) is to identify the type of environment that needs to be created, this information being determined from the type of the device under test. For example, if the device to be tested is an AHB master device, then in preferred embodiments the test environment will need to include an arbiter, decoder, a default master and one or more slave models. Alternatively, if the DUT is an AHB slave, then the test environment will need to include at least a decoder and a master model.

Once the type of environment has been identified, then instances of the objects required are then created at step 710. Accordingly, it is at this point that the test components required for the test environment are created, in preferred embodiments each test component being instantiated as an OOP object. Hence, returning to the AHB master DUT example just mentioned, at step 710 an arbiter, decoder, default master and a slave object will be generated for incorporating with the DUT to form the test environment.

As will be appreciated by those skilled in the art, in OOP programming, a number of methods are associated with each object to define its functionality. In accordance with preferred embodiments of the present invention, the actual methods to be associated with each instance of the object are dependent on the type of environment detected at step 700. For example, if the DUT is a master device, then the decoder object generated merely needs to be able to select a slave to respond to requests from the master. However, if the DUT is a slave device, then it is preferable if the decoder also includes functionality to enable it to deselect the DUT, to enable selection of another slave, so as to enable the behaviour of the slave DUT to be determined when it is deselected by the decoder.

The process then proceeds to step 720, where the signal mapping between devices is updated. As mentioned earlier, this involves reference to the signal mapping information provided in the user configuration file, and maps the signal names used by the DUT to the AMBA signal names used within the rest of the test environment.

The process then proceeds to step 730, where starting values for each of the signals are set up. For example, if the DUT is a slave device, then it needs to assert a logic one HREADY signal to confirm that it is ready to receive a transfer request from a master device.

Following completion of step 730, the process then returns to step 650 in FIG. 6, where processing is handed back to the simulator tool. At step 660, the simulator then runs the test, in active mode, this being the user defined test sequence or test sequences identified in the user configuration file. As an option, the compliance tool can be arranged when checking the user configuration file to actually perform a check of the user defined test sequence identified within the user configuration file to check that that user defined test sequence is valid. Such as step would typically occur at step 625. It can be useful to perform this check at that time, since it may be intended to run the actual test at some convenient time subsequently, for example overnight, and it is obviously desirable to know that there is nothing fundamentally wrong with the test sequence before starting the test at step 660.

Having described the process performed in preferred embodiments to run a compliance test in either the active or passive mode, more details of the protocol checking and coverage monitoring performed in preferred embodiments will now be provided.

As mentioned earlier, there is no configuration of the protocol rules, and a DUT must not violate any of the AMBA protocol rules in order to claim compliance with the AMBA bus protocol.

However, in contrast, the coverage points are in preferred embodiments configured to allow for the fact that certain DUTs will not utilise all of the features of the AMBA bus. It is important to note that the allowable configurations for a DUT are defined so that all components to be incorporated into the SoC will always work together correctly.

As a basic rule, an AMBA component must be able to accept all possible input combinations, but it does not have to generate all possible output combinations.

As an example, a bus master that has input signals for Transfer Ready, Transfer Response and Bus Grant must be able to deal with all possible combinations of these inputs. However, it is not required to generate all possible output combinations, so it is only required to generate the types of burst and transfer sizes that are appropriate to its operation.

It should also be noted that turning off certain coverage points will enable additional protocol checks. For example, if a bus master compliance check is configured for a bus master which does not support 4-beat wrapping bursts, this configuration option will have the effect of removing the coverage points to observe various types of 4-beat wrapping bursts. It will however enable an additional check to ensure that the master never performs this type of transfer.

A slave device must also be capable of accepting all possible inputs and must deal correctly with all the different combinations of transfers. However, it is acceptable to build slave devices which do not utilise all of the transfer information that is available on the bus. A typical example of this would be a slave device which does not use the burst information. To simplify the compliance testing of such slave devices, if the slave does not have certain signals as inputs, then the coverage points related to the different combinations of those inputs can be omitted.

Looking specifically now at details of the protocol checking function, the basic principle of protocol checking an AMBA bus is to employ a sequence of checks for ensuring that the AMBA bus protocol is observed during transactions, which comprise of a number of bursts of individual transfers. In preferred embodiments, the compliance tool uses temporal expressions to allow simulation events to trigger heuristics that describe these protocol checks.

A temporal expression is a combination of events and temporal operators that described behaviour. A temporal expression captures temporal relationships between events, values of fields, variables, or other items during a test.

It will be appreciated that a large and varying number of temporal expressions may be used in the compliance tool of preferred embodiments. For the purposes of illustration, a brief concept view of how these constructs are used will be discussed below.

In preferred embodiments, the Verisity Specman "e" language is used to define the temporal expressions. At the top of FIG. 8, four examples of legends that may be used as temporals graphics are shown. The remainder of FIG. 8 then provides, as an example, an AMBA AHB sequence evaluation illustrating the monitoring of hgrant events with respect to the HTRANS signal being set to IDLE (an htrans.idle event).

Figure 8:
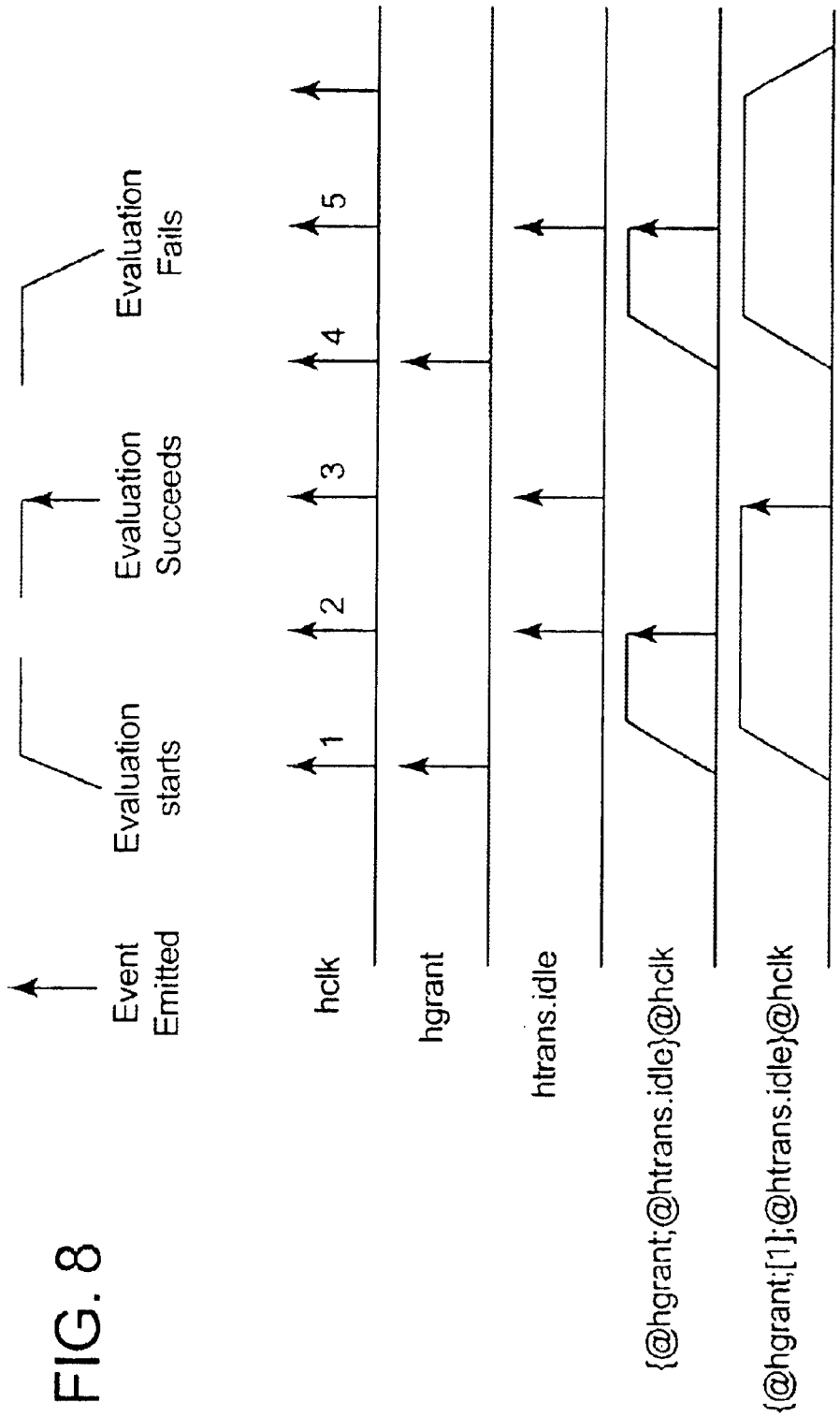
FIG. 8 is an example graphical notation used to represent evaluation of temporal sequences when performing protocol checking in accordance with preferred embodiments of the present invention.

With reference to FIG. 8, the HCLK event is the sampling event for the two sequences involving the hgrant and htrans.idle events. The hclk event itself is emitted at the rise of the HCLK signal.

From FIG. 8, it can be seen that some events shown relate directly to signal values, whilst other events are defined from a combination of signal states sampled at the reference event, in this example the reference event being the rising edge of HCLK.

The {@hgrant;@htrans.idle} sequence starts evaluating each time hgrant occurs at hclk. When htrans.idle is sampled one hclk after hgrant, the sequence succeeds.

The {@hgrant;[1];@htrans.idle} sequence also starts evaluating at the first hgrant occurrence at hclk, and shifts at the next occurrence of hclk due to the "followed by one cycle" clause ([1]). On a third occurrence of hclk, the sequence succeeds due to the presence of the htrans.idle event. It can be seen from FIG. 8 however that the temporal expression does not evaluate after the fifth cycle, because of the absence of the htrans.idle event.

In this way, protocol errors can typically be defined by using events such as those described above with reference to FIG. 8 to capture a condition where a particular rule is not being observed. These events can be used to either build further event sequences, or they can be logically combined to generate assertion statements. A typical form of a compliance tool protocol rule may be:

expect<rule>is {<temporal-expression>}@hclk;

Another approach that can be adopted instead of using temporal expressions is to use available Property Checker tools that are based on formal mathematical techniques. Formal property checking involves writing a property that closely matches a system requirement, and then proving exhaustively that the property holds on the design. The exhaustive nature of this technique means that it can find bugs that are not covered by functional simulations.

Property Checker tools work best at the block levels, with blocks under 100K gates being ideal.

Figure 9A:
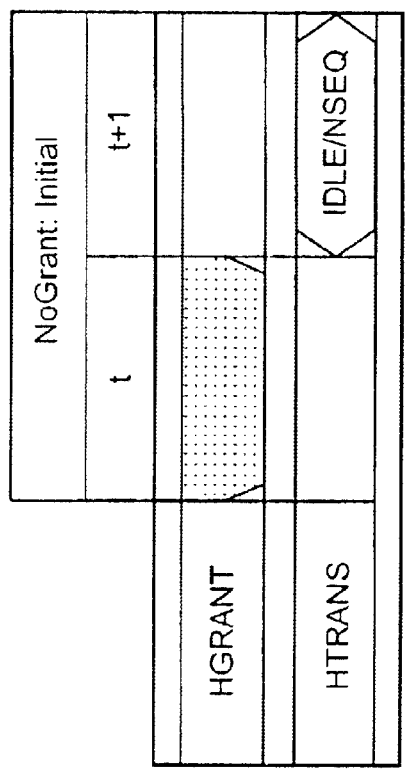
FIGS. 9A and 9B are timing diagrams representing properties that may be checked when performing protocol checking.

An example of a property which may be checked by a property checking tool is a requirement for the HTRANS signal output to be IDLE or NON-SEQUENTIAL if the AHB master is not granted. This property can be written to match the timing diagram illustrated in FIG. 9A. Times t and t+1 in the timing diagram of FIG. 9A represent clock cycles. The dotted value is an assumption and the following IDLE/NSEQ part is a proof obligation. The timing diagram is saying that if the HGRANT signal is low in one clock cycle (time t), then the HTRANS signal must be IDLE or NSEQ in the following clock cycle. The proof is exhaustive, so time t can be any arbitrary clock cycle. Hence, property checking can be viewed as sliding the timing diagram over an exhaustive simulation—whenever the assumption holds, the obligations must also hold.

If the property is found to hold, then the RTL representation of the DUT should always satisfy the requirement specified by the property. If the property does not hold at any instance, then the property checker preferably outputs a short waveform file specifying the error, which can then be used for debugging.

As an example of such debugging, when the property of FIG. 9A was applied to a DUT in a test environment, a debug waveform was produced which highlighted a failure in the property where the HGRANT signal was low at time t but the HTRANS signal was SEQ at t+1. In actual fact, there was no bug in the RTL representation of the DUT, but instead the property itself was incomplete. Indeed, there is a situation where if the AHB master is waiting (HREADY signal input low) then HTRANS should be maintained. Accordingly, the corrected property can be illustrated by the revised timing diagram of FIG. 9B.

Figure 9B:
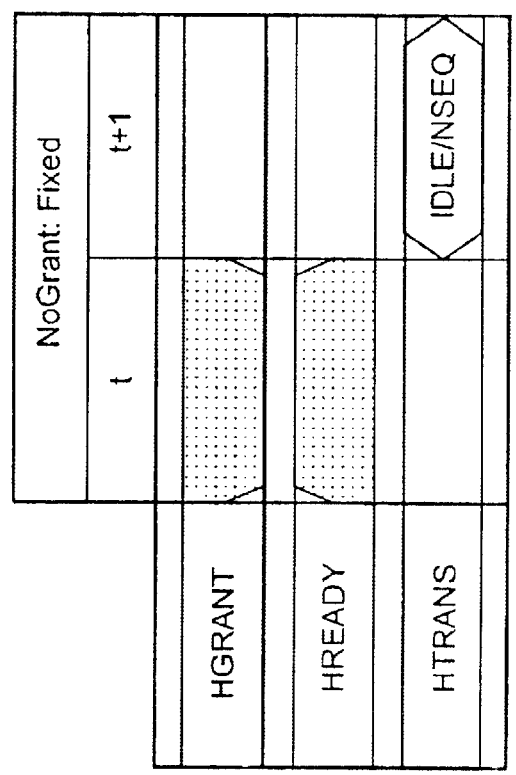

The property as shown by the timing diagram of FIG. 9B states that if the master is not granted and is not waiting, then the HTRANS signal must be IDLE or NSEQ in the following clock cycle.

Having discussed property checking, a brief description of coverage monitoring will now be provided. As mentioned earlier, coverage is the process of observing specific sequences of bus activity. In preferred embodiments, the Verisity Specman tool is used, which enables coverage monitoring through the definition of coverage groups. A coverage group is a program structure/object member that contains a list of data items for which data is collected over time.

The Specman tool also has the ability to perform cross-coverage, which allows observation of interaction between coverage data items. An AMBA AHB master example of cross-coverage usage would be to ensure that for each burst type (SINGLE, INCR, WRAP4, INCR4, WRAP8, INCR8, WRAP16, INCR16), there are different slave response types observed for both read and write bursts. As mentioned earlier, at the end of a test execution run, all coverage information is collated into a GUI that enables the user to identify how much of the required coverage points have been monitored for the DUT.

Having described the test compliance tool of preferred embodiments in detail, a brief illustration of a data processing system in which the compliance tool can be used will now be illustrated with reference to FIG. 10.

Figure 10:
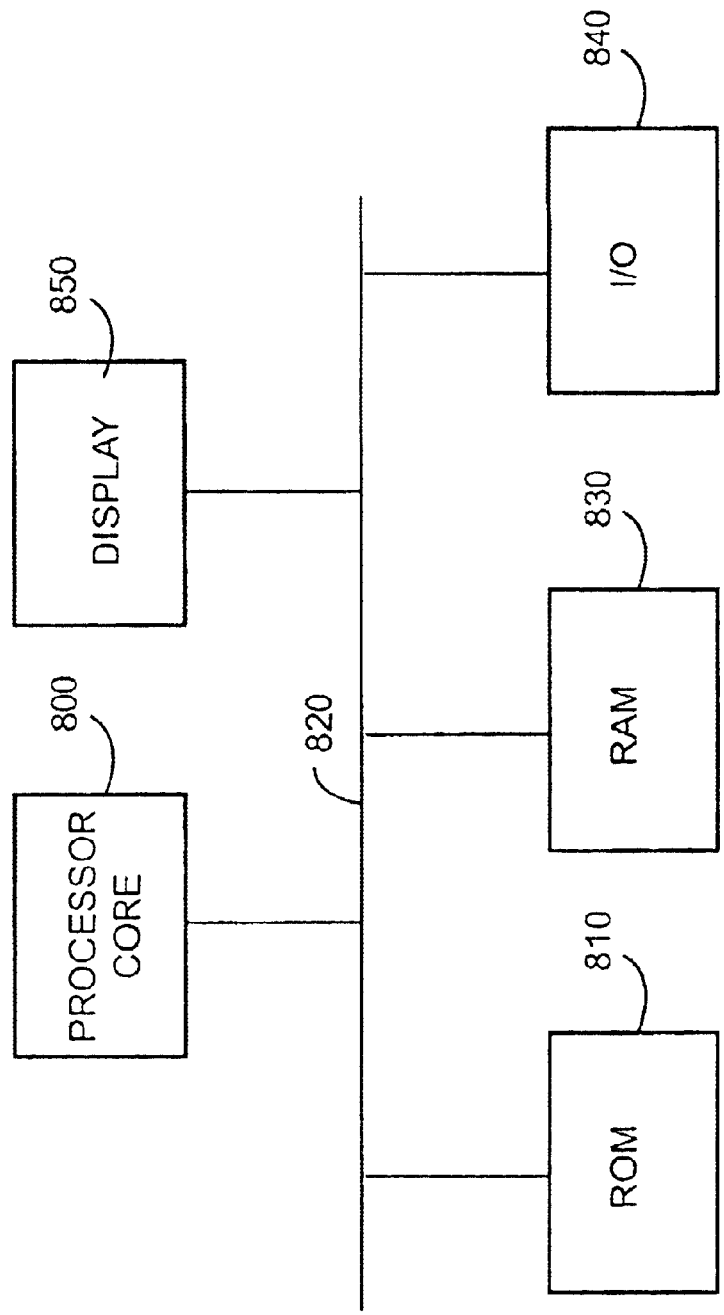
FIG. 10 is a block diagram schematically illustrating a data processing system in which the testing procedures of preferred embodiments may be executed.

FIG. 10 illustrates a data processing apparatus comprising a processor core 800, a read only memory (ROM) 810, a random access memory (RAM) 830, an input/output (I/O) device 840 and a display 850, which are interconnected via an appropriate bus network 820. It will be appreciated that the bus 820 may be a single bus, or may be any combination of buses required to connect the components with each other.

In preferred embodiments, the simulator tool and the compliance tool of preferred embodiments are loaded into RAM 830, and then executed on the processor core 800. The operating system, e.g. BIOS, will typically be stored on the ROM 810.

The inputs required to perform any particular test will typically be input by a user via the I/O device 840 for storage in the RAM 830. Hence, in active mode, the user will input via I/O device 840 the interface module containing the DUT, the user configuration file, and the user defined test sequence, these for example being read by the I/O device 840 from a disk. This information will then be retrieved by the processor core 800 from the RAM 830 as and when required during execution of the simulator tool and compliance tool. During or after execution of the test, the results of the test will be displayed on display device 850, for example a VDU. Once all of the coverage points have been monitored without any of the protocol rules being violated, a compliance certificate can be generated for outputting via the I/O device 840 to any appropriate output device.

In summary, it can be seen that the compliance tool of preferred embodiments provides a particularly user friendly and efficient technique for testing compliance of devices with a bus protocol. In active mode, the DUT is tested as a stand alone unit, with an optional trickbox device that the tester can use to interface to non-AMBA I/O signals. This optional trickbox can be used to provoke certain required behaviour of the device under the control of the tester. In active mode, user generated stimulus files are read by the compliance tool to drive desired stimulus onto the bus interface signals specified in the user configuration file. In the case of a master DUT, a vector stimulus file is supplied that determines the slave response behaviour including wait states, response types, grant status along with expected accesses to the device for data checking purposes. In the case of a slave DUT, the vector stimulus file provided by the user specifies valid master bus transactions. With both types of input stimulus file, the user has control over whether or not the test environment overrides the user-defined stimulus with randomly generated behaviour. In the case of the slave testbench, random generation could cover wait-states, responses and grant status, etc.

In passive mode, the device is tested as part of a system, that is the compliance tool does not supply any driving capability or support dynamic generation of test components such as decoders, arbiters, masters and slaves. It is the tester's testbench that supplies the entire supporting infrastructure for the DUT to be driven. This is especially useful for compliance testing of legacy SoC designs or when integrating peripherals together for the first time. With the driving capability of the compliance tool disabled, the protocol checking and coverage point collection mechanisms work identically to those used in active mode.

In preferred embodiments, when a test run completes without the generation of any bus protocol errors, a GUI is loaded that displays the coverage details for the DUT. Here any coverage holes can be identified, such that the DUT can be driven in a more directed way on subsequent test runs to satisfy the previously missed coverage points. After successfully achieving compliance in this way, a check-summed compliance certificate may be generated granting compliance with the bus protocol given the original device capability specified. For example, if a master DUT was specified as only supporting incrementing bursts, then its compliance certificate explicitly states this fact.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

What is claimed is:

1. A method of testing compliance of a device with a bus protocol of a bus, the device being a component of a system-on-chip, and the bus being provided within the system-on-chip, the method comprising the steps of:
    (a) reading a configuration file containing predetermined parameters identifying the type of the device and capabilities of the device;
    (b) employing a configuration engine to dynamically generate a test environment for the device by creating selected test components which are coupled via the bus with a representation of the device to form the test environment, the test components being selected dependent on the configuration file;
    (c) causing a test sequence to be executed; and
    (d) monitoring signals passed between the representation of the device and one or more of the test components during execution of the test sequence to generate result data indicating compliance with the bus protocol.

2. A method as claimed in claim 1, wherein the configuration file is selected from a set of configuration file templates, the set containing a configuration file template for each type of device, and each configuration file having a number of entries for providing configuration information specific to the device.

3. A method as claimed in claim 1, wherein said step (d) comprises the step of employing a protocol checking component to check that signals passed between the representation of the device and one or more of the test components during execution of the test sequence do not violate a set of predetermined rules of the bus protocol.

4. A method as claimed in claim 1, wherein said step (d) comprises the step of employing a coverage monitoring component to monitor signals passed between the representation of the device and one or more of the test components during execution of the test sequence to determine whether a set of coverage points are observed.

5. A method as claimed in claim 4, wherein the set of coverage points is configured dependent on the configuration file read at said step (a).

6. A method as claimed in claim 5 wherein said step (d) comprises the step of employing a protocol checking component to check that signals passed between the representation of the device and one or more of the test components during execution of the test sequence do not violate a set of predetermined rules of the bus protocol, and wherein, if all coverage points in the set have been observed without violating any of the set of predetermined rules of the bus protocol, the method further comprises the step of generating an output confirming compliance with the bus protocol.

7. A method as claimed in claim 1, wherein at said step (b) the step of creating selected test components comprises selecting the test components to be created in dependence on the type of device to be tested.

8. A method as claimed in claim 7, wherein at least one of the test components has associated therewith a plurality of behaviours that it may exhibit, the choice of behaviour being determined when that test component is created dependent on the type of device to be tested.

9. A method as claimed in claim 1, wherein the test sequence is a user-definable test sequence developed for the device to be tested.

10. A method as claimed in claim 1, wherein the representation of the device is created within an interface module, and said step (b) of generating the test environment includes mapping signals within the interface module to signals within the test environment, the mapping being defined within the configuration file.

11. A method as claimed in claim 10, wherein the configuration file identifies a level of hierarchy of the representation of the device within the interface module to facilitate the mapping of signals.

12. A method as claimed in claim 1, further comprising the step of:
    providing a trickbox component compatible with the bus protocol and provided with a general-purpose input/output interface.

13. A method as claimed in claim 1, wherein the type of device that may be tested comprises a master, a slave, an arbiter or a decoder.

14. A method as claimed in claim 1, wherein the bus protocol is the ARM AMBA bus protocol, the bus comprises a system bus and a peripheral bus, and the type of device which may be tested comprises a system bus master, a system bus slave, a peripheral bus master, a peripheral bus slave, an arbiter or a decoder.

15. A method as claimed in claim 1, wherein the representation of the device is a Register Transfer Language (RTL) representation.

16. A computer program operable to configure a processing unit to perform a method of testing compliance of a device as claimed in claim 1.

17. A carrier medium comprising a computer program as claimed in claim 16.

18. A data processing apparatus for testing compliance of a device with a bus protocol of a bus, the device being a component of a system-on-chip, and the bus being provided within the system-on-chip, the apparatus comprising:
    memory for storing a configuration file containing predetermined parameters identifying the type of the device and capabilities of the device; and
    a processing unit arranged to perform the steps of:
    (i) dynamically generating a test environment for the device by creating selected test components which are coupled via the bus with a representation of the device to form the test environment, the test components being selected dependent on the configuration file;
    (ii) executing a test sequence; and
    (iii) monitoring signals passed between the representation of the device and one or more of the test components during execution of the test sequence to generate result data indicating compliance with the bus protocol.

* * * * *